UNITED STATES PATENT OFFICE.

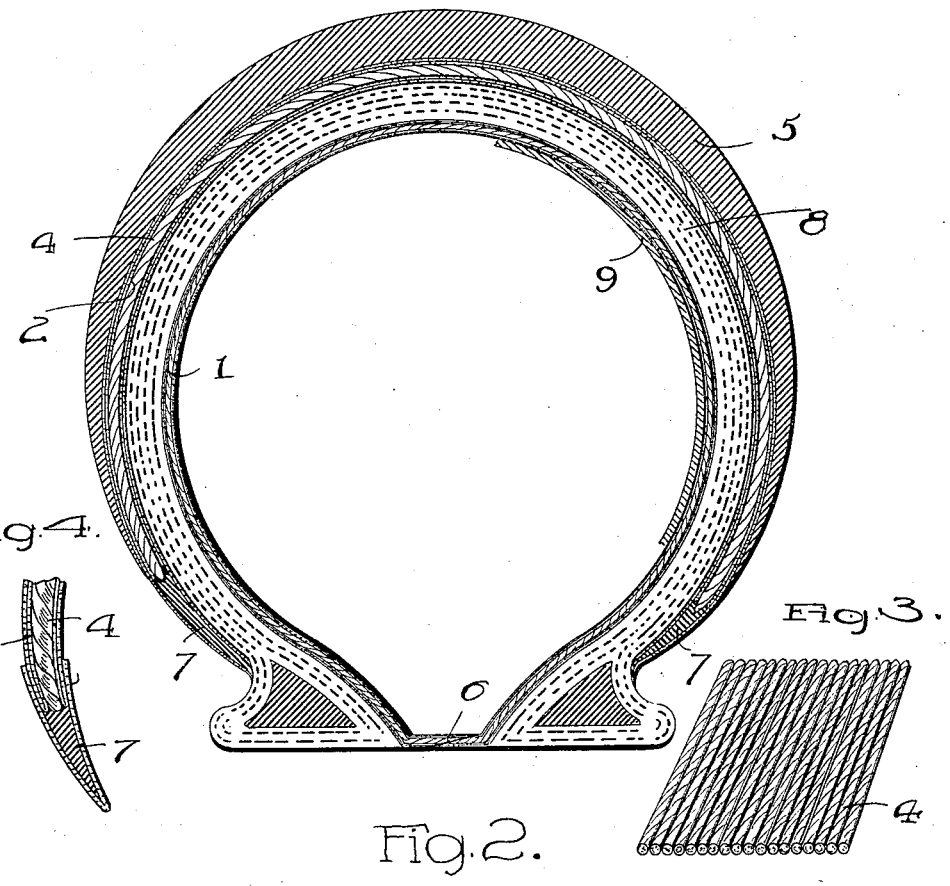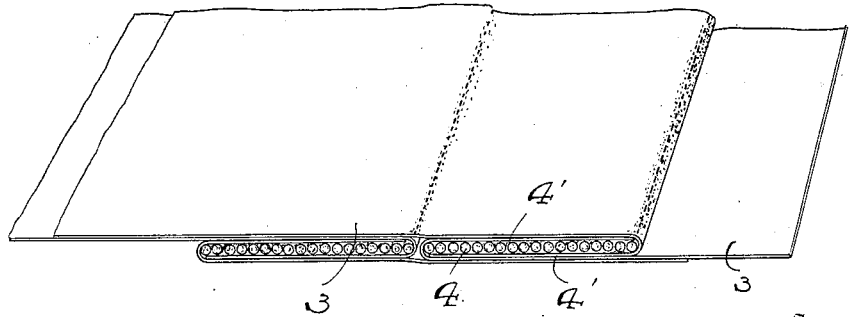

RALLY EHLE AND REX EHLE, OF COUNCIL BLUFFS, IOWA.

PNEUMATIC TIRE.

1,069,239.  Specification of Letters Patent.  Patented Aug. 5, 1913.

Application filed March 26, 1912. Serial No. 686,347.

*To all whom it may concern:*

Be it known that we, RALLY EHLE and REX EHLE, citizens of the United States, residing at Council Bluffs, in the county of Pottawattamie and State of Iowa, have invented certain new and useful Improvements in Pneumatic Tires, of which the following is a specification, reference being had therein to the accompanying drawing.

This invention relates to automobile tire protectors.

The principal object of this invention is the production of an efficient tire protector which is made up of several laminations of toughened fabric which is treated with rubber or other adhesive material for forming a compact mass.

With this and other objects in view this invention consists of certain novel constructions, combinations, and arrangements of parts, as will be hereinafter fully described and claimed.

In the drawings: Figure 1 is a transverse sectional view of the tire. Fig. 2 is a detail perspective of a pair of sections forming the protector means. Fig. 3 is a detail perspective of a number of the protector cords or strands showing the manner of assembling the same in order to form the protecting medium for the tire protector. Fig. 4 is an enlarged detail section of the lower end of the tire protector as is used when forming the tire.

It should be borne in mind that the present device as illustrated and hereinafter described may be formed as a portion of the tire itself as indicated in Fig. 1 or may be formed as an inner protector covering placed between the inner tube of the tire and the outer casing. In Fig. 1, the tire is shown as provided with the inner protector 1, as well as the embedded covering 2 formed in the tire itself. It should be understood that either of the protector means 1 and 2 may be used independently of the other without departing from the spirit of the invention, and furthermore, it should be understood that, especially in light tires, the inner protector casing 1 is adapted to be used, and it is not necessary to use the embedded protector when a light tire is used. The inner protector 1 may be, and is, manufactured entirely separate from the tire and may be inserted within the tire of the ordinary pneumatic type without affecting the construction of the same. These protector casings, both the structure as shown in the embedded protector and the separate casing, are formed in like manner, only the inner protector is formed of lighter material than that which is embedded in the tire as will be further described in the following specification.

The protectors are formed from a plurality of sections which have portions overlapping each other to form a continuous band. These sections extend transversely of the tire as illustrated in Fig. 1. Each of the sections comprises a plurality of strands of rope, cord, or other material 4 which are coated with some adhesive substance for firmly holding the strands in their correct parallel relation. These strands pass transversely of the tire and conform to the shape thereof, and are embedded between the folded ends 4' of the fabric covering 3, which folded ends constitute a pocket. Two sheets of the fabric covering 3 are employed. The main portion of the protector fabric sheet 3 is bent back upon the inner end of the adjacent fabric sheet, thereby forming a complete incasement for the rope strands 4 as illustrated in Fig. 2. These strands 4 are stretched parallel to each other, and are covered with a coating of rubber or other suitable cement, as above stated, and are placed length to length, as especially illustrated in Fig. 3 thereby dividing the tire protector into a number of individual protector strips which strips are closely fitted together to constitute a continuous band around the entire face of the tire. These strands 4 are of sufficient length to accommodate the different sized tires upon which the protector is used. It will be seen by carefully considering Fig. 2 that the ends of the fabric covering 3 extend in opposite directions thereby forming an efficient wrapping for the strands 4, and preventing the displacement of the strands from the pocket. After one section has been formed another exactly similar to that described is placed upon the lower free end of one of the complete protector sections and has one side of the cord containing pocket abutting the side of the cord containing pocket of the next succeeding protector, thereby forming a continuous protector band for the tire. From Fig. 2, it will be seen that the free ends of the protector strips overlap each other and form a continuous band, and the fabric 3 may be formed of any desired material and may also be coated with an adhesive substance for facilitating the adherence of one section of the protector strip to the other as illustrated in Fig. 2.

When the protector is used as a portion of the tire itself and is embedded therein, the process of manufacturing or embedding the protector within the tire is as follows:— The protector strips are manufactured as above set forth and connected together as illustrated in Fig. 2 and previously described, in such a manner as to form a complete circle of sections, which sections extend transversely of the circle, said circle being formed of sufficient size to fit the tire for which the protector is intended. This circle of sections so prepared is then placed on a form composed of one ply of fabric, to constitute a protector. This protector is then placed upon an air bag and then inclosed by two steel rims. It is then wrapped in cloth bands and the said protector so prepared is placed in a steam heater and cured or vulcanized. At the end of this curing or vulcanizing process, the protector or casing is then removed and is complete and ready to be placed in the tire for use and to receive the outer coating of rubber as is usual in the ordinary case. These sections of protector strips have their inner ends embedded in a rubber rim 7 which extends around the side edges of the protector and this rubber rim forms an efficient holding means for the inner ends of the protector and prevent the fabric, as well as the rope strands from becoming frayed.

The protector, which may be used merely between the inner tube of the tire and the outer casing is manufactured in the same manner as above set forth with the exception that the outer casing of rubber 5 is entirely eliminated from the protector 1, and the free edges of the inner tube protector are beveled so as to overlap as indicated at 6. The free edges of this tube 1 may also be slightly coated with rubber or other adhesive material to prevent the fabric or strands 4 from becoming frayed. This protector 1 is interposed between the tire 8, and the inner tube 9.

From the foregoing description it will be obvious that a very efficient and durable protector has been produced which will prevent the inner tube from becoming punctured and will prolong the life of the inner tube by preventing the same from blowing out, provided the outer casing should become injured or weakened by use.

What is claimed is:—

1. A tire of the class described comprising a plurality of fabric sections, each of said fabric sections provided with an extending flap, the extending flap of one section overhanging a portion of the adjacent section for constituting a pocket, a plurality of strands positioned within said pocket, and means for securing the ends of said sections together for forming a complete protector.

2. A tire protector comprising a plurality of overlapping sections, each section comprising a pair of fabric sheets having their inner ends interlocking for constituting a pocket, a plurality of parallel strands positioned within said pocket and extending longitudinally thereof, a portion of said fabric sections extending beyond said pocket and overlapping the next adjacent section, and means whereby said sections are secured together.

3. A tire protector of the class described comprising a plurality of transversely extending sections, each section made up of a pair of sheets having interfolded ends, a plurality of parallel strands extending transversely of said sheets and being placed between the interfolded ends thereof, each sheet provided with an extending portion adapted to overlap the next adjacent sheet whereby said sheets may be firmly held together and said sheets being secured together by means of adhesive substance.

In testimony whereof we hereunto affix our signatures in presence of two witnesses.

RALLY EHLE.
REX EHLE.

Witnesses:
 GEO. S. WRIGHT,
 V. LYORGLEY.

Copies of this patent may be obtained for five cents each, by addressing the "Commissioner of Patents, Washington, D. C."